July 26, 1932.  K. VOSSLOH  1,868,861

NUT LOCK

Filed June 13, 1930

Inventor:
Karl Vossloh
by Richard E. Babcock
Attorney

Patented July 26, 1932

1,868,861

UNITED STATES PATENT OFFICE

KARL VOSSLOH, OF WERDOHL-IN-WESTPHALIA, GERMANY

NUT LOCK

Application filed June 13, 1930, Serial No. 460,954, and in Germany October 14, 1929.

The invention relates to a nut lock of that type comprising a plurality of coils of a helical spring the end-coils of which are bent out of the normal helical line so as to form arches with chisel shaped edges at the free ends of the arched coils.

The object of the present invention is to provide a nut lock formed by a segment of a helical spring having arched end-coils the free ends of which on the one hand shall produce a chisel effect in the fullest desired degree and thus prevent the nut from becoming loose, while on the other hand this chisel action nevertheless shall allow to release the screw connection when desired by overcoming a resistance which is only initially great without any considerable injury to the nut or to the bearing surfaces.

Nut locks comprising a segment of a helical spring provided with chisel-like projecting edges at the ends have already been made known, by themselves. In nut locks the coils of which are situated in a normal helix the projecting edges cut off are bent out in an opposite direction at the ends of the segment of the helical spring. In nut locks provided with undulated coils in the helical spring the ends of the latter provided with the chisel-shaped edge are bent out in an axial direction in such a way that the edges cut off extend beyond the apex of the adjoining wave.

In either instance the chisel-shaped edges of the ends of the spring are the most projecting points, even if the nut lock is more or less released so that the chisel effect of the ends of the spring is continually exerted on the bearing surfaces, viz. independently of the tension which prevails in the nut lock.

Consequently, an intended loosening of the nut locked by devices of the type referred to can be accomplished but very difficultly and not without the bearing surface and the nut being seriously damaged so that the latter is rendered unusable by one release, as a rule. This is a serious inconvenience of the nut locks hereto known which consist of a segment of a helical spring provided with chisel-shaped edges outwardly projecting.

A further inconvenience of the nut lock consisting of one or more spring coils provided, as usually, with chisel-shaped edges at the ends consists in the fact that the projecting ends result in an oblique position of the spring washer. Therefore the nut lock exerts a lateral pressure on the shaft of the bolt which also occupies an oblique position on account of this unilateral pressure.

The object of the invention is to do away with these drawbacks in such a way that, without the bolt being liable to occupy an oblique position, the chisel effect of the edges outwardly projecting, which first is intended for preventing an unintentional release, is fully maintained while the nut lock is under tension whereas an intended loosening of the screw joint is possible without sensibly damaging the nut and the bearing surface respectively and by overcoming a resistance which is rather substantial in the beginning only.

This has been obtained according to the present invention in that the end-coils of the spring are bent out of the normal helical line into an arcuate form in one direction in such a degree that the vertices of the halves of the arched coils, adjacent the chisel edges, in axial direction project over the corresponding chisel-shaped end in a measure such as will not allow the chisel edges to engage the bearing surface and the nut respectively until the spring has been compressed to a degree by which the terminal tension of the screw connection has been approximately arrived at when the nut is being driven home. The novel nut lock being used, the screw joint will be secured not only by the reaction pressure of the spring tension but also by the edges of the ends penetrating like a chisel into the bearing surface as the nut lock is fully or almost fully compressed. As soon however as the nut has been turned back through a definite angle, although with a certain expenditure of force in the beginning, so that the release of the nut lock has been initiated, further slacking the nut can be accomplished merely against the remanent pressure of the nut lock without the chisel-shaped helical-spring ends being an impediment to the movement of the nut and destroying the bearing surfaces respectively since said ends are being more and more withdrawn from the bearing surfaces on account of the increasing curvature of the arched spring coils.

With the novel nut lock also an oblique bearing and an oblique compression is obviated because the coils do not bear against the nut with the chisel-shaped ends at first but with the arches so that the compression is exactly axial when the nut is being pulled home and no lateral transverse forces canting the bolt are liable to arise.

The accompanyng drawing shows the invention by representing a nut lock comprising two coils of a helical spring and in this drawing.

Figure 1:
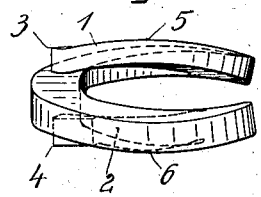
Fig. 1 is a perspective view.
Figure 4:
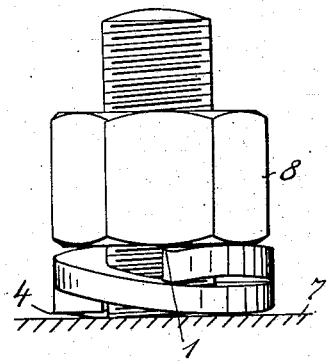
Figs. 4 and 5 show the novel nut lock in the partially and fully compressed conditions.
Figure 5:
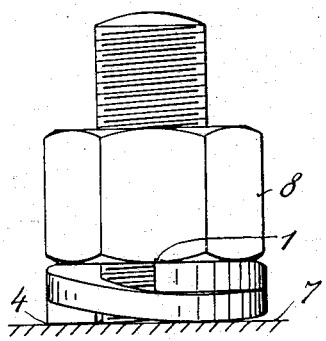

In the instance of execution represented both halves of one of the coils of the helical spring are curved in one direction almost over their whole length and both halves of the other coil in the opposite drection. So the direction of the spring ends 1 and 2 is turned away from the corresponding bearing surfaces and their cut-off edges 3 and 4 projecting like chisels therefore are not the most projecting points of the nut lock but are more or less withdrawn in relation to tops 5 and 6 of the arches when the nut lock is fully released (Fig. 1) or partially released (Fig. 4). But as the nut lock has been fully or almost fully compressed (Fig. 5) the outwardly projecting edges 3 and 4 penetrate like chisels into the bearing surface 7 and the bottom face of the nut 8.

Figure 3:
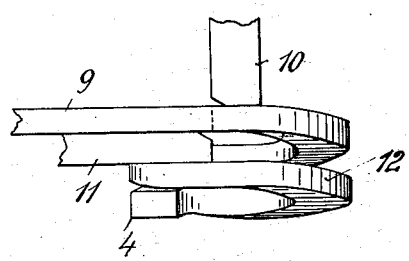
Fig. 3 shows an operation in the making of the novel nut lock.
Figure 2:
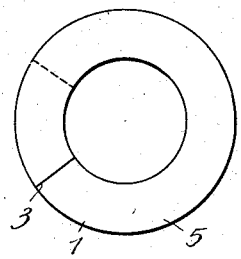
Fig. 2 is a top view of the nut lock fully released.

In the making of the novel nut lock, the spring wire 9 is preferably cut into helical-spring segments 12, when being coiled, by cutting tools 10 and 11 according to Fig. 3 in such a way that said segments are provided with the outwardly projecting edges whereupon the segments are pressed into the well-known arched shape with the ends of the helical spring being bent into a slope direction turned away from the bearing surfaces.

The number of the spring coils constituting the nut lock may naturally be chosen at will the same as the number and the arrangement of the arches of the spring coils. However it is a paramount condition that the arches adjacent to the spring ends are shaped so that the said ends provided with the chisel-shaped edges are turned away from the bearing surfaces.

What I claim is:

1. A nut lock, consisting of a plurality of coils of a helical spring having the end-coils formed with chisel-shaped free ends, the said end-coils being bent out of the normal helical line in one direction only so as to form each an axially directed arch, the crowns of the said both arches in axial direction overtopping the chisel-shaped ends of the said arched coils and thereby not allowing the said chisel-shaped ends to engage the bearing surface and the nut respectively until the terminal tension of the screw connection has been approximately arrived by the compression of the spring.

2. A nut lock, consisting of a plurality of coils of a helical spring having the end-coils formed with chisel-shaped free ends, one of the said end-coils being bent out axially of the normal helical line to form an arch curved outwards in one direction and the other end-coil being bent axially to form a similar arch curved outwards in the opposite direction, the crowns of the said both arches in axial direction overtopping the chisel-shaped ends of the said arched coils and thereby not allowing the said chisel-shaped ends to engage the bearing surface and the nut respectively until the terminal tension of the screw connection has been approximately arrived by the compression of the spring.

In testimony whereof, I have signed my name to this specification at Cologne this 28th day of May, 1930.

KARL VOSSLOH.